US009926208B1

(12) United States Patent
Oberle

(10) Patent No.: US 9,926,208 B1
(45) Date of Patent: Mar. 27, 2018

(54) MISCIBLE SOLVENT TREATMENT

(71) Applicant: TRS Group, Inc., Longview, WA (US)

(72) Inventor: Daniel Oberle, Sylvania, OH (US)

(73) Assignee: TRS CHINA LLC

( * ) Notice: Subject to any disclaimer, the term of this patent is extended or adjusted under 35 U.S.C. 154(b) by 438 days.

(21) Appl. No.: 14/636,727

(22) Filed: Mar. 3, 2015

Related U.S. Application Data

(60) Provisional application No. 61/949,504, filed on Mar. 7, 2014.

(51) Int. Cl.
*C02F 1/04* (2006.01)
*C02F 101/32* (2006.01)

(52) U.S. Cl.
CPC .......... *C02F 1/04* (2013.01); *C02F 2101/322* (2013.01)

(58) Field of Classification Search
CPC ....................................................... C02F 1/04
USPC ........................................................... 203/10
See application file for complete search history.

(56) References Cited

U.S. PATENT DOCUMENTS

| | | | |
|---|---|---|---|
| 2006/0272933 A1* | 12/2006 | Domen | B01D 1/0047 203/10 |
| 2009/0126652 A1* | 5/2009 | Murphy | F24H 1/201 122/19.2 |
| 2014/0021131 A1* | 1/2014 | Fassbender | C02F 3/302 210/612 |
| 2015/0166363 A1* | 6/2015 | Eyal | B01D 11/0403 210/652 |

OTHER PUBLICATIONS

Odah, M. et al. (2005). "ART In-Well Technology Proves Effective in Treating 1,4 Dioxane Contamination." Remediation. 51-64.*
Environmental Engineer: Applied Research and Practice, American Academy of Environmental Engineers,vol. 2, Spring 2007, reprinted from Spring 2007 Edition of Environmental Engineer (vol. 32, No. 2), Treatment Options for Remediation of I, 4-Dioxane in Groundwater, William Diguiseppi, P.G., and Caroline Whitesides, P.G. pp. 2-7.

* cited by examiner

*Primary Examiner* — Jill A Warden
*Assistant Examiner* — Jacqueline Brazin
(74) *Attorney, Agent, or Firm* — Joan T. Kluger; Barnes & Thornburg LLP

(57) ABSTRACT

Water containing one or more solvents miscible in the water is heated to its boiling point. Air is introduced into the vapor mixture of steam and the miscible solvent at an air-to-steam volumetric ratio that is sufficient to get good transfer of the miscible solvent from the steam to air and provides an equilibrium temperature of the steam-air mixture compatible with operations of the heat exchanger. The mixture of gases is then rapidly cooled to condense the steam into water so that a substantial portion of the miscible solvent remains volatilized in the air. The air and condensed steam fractions are separated.

20 Claims, 3 Drawing Sheets

MISCIBLE SOLVENT TREATMENT

BACKGROUND

The solvent stabilizer 1,4-dioxane has drawn increasing attention as it is being discovered in water supplies across the United States. Although once thought to be a benign compound, recent toxicology tests have shown that 1,4-dioxane is a probable human carcinogen. 1,4-dioxane was added to solvents like 1,1,1-trichloroethane as an antioxidant and acid inhibitor and the solvent was frequently spilled or dumped onto the ground where it entered the groundwater. The stabilizer 1,4-dioxane is miscible in water so once it gets into the groundwater it is very difficult to remove. The low Henry's constant of 1,4-dioxane makes technologies such as stripping ineffective because the transfer of 1,4-dioxane from water into air is considered negligible. Studies have shown that as little as 10 percent removal of 1,4-dioxane can be achieved from groundwater using stripping, even at an air-to-water stripping ratio 10 times more aggressive than conventional designs used for most other volatile organics. This has led those skilled in the art to conclude that the small decreases in 1,4-dioxane concentration are not repeatable or reliable enough to consider stripping to be a viable option for 1,4-dioxane remediation. Because of the great difficulty that exists in removing 1,4-dioxane from water, the only reliable technology believed known for treatment of 1,4-dioxane in water is the very expensive technology known as advanced chemical oxidation. Accordingly, there is a need for an alternative method to remove 1,4 dioxane from water.

SUMMARY OF THE INVENTION

The invention comprises a stripping process to remove 1,4-dioxane, and other miscible solvents with an azeotrope boiling point less than 100° C., from water using steam and air as the stripping gases. Water that contains the miscible solvent is heated to its boiling point. Air is introduced into the mixture of steam and the miscible solvent vapors. The mixture of air, steam and the miscible solvent gases is then rapidly cooled to condense the steam into water. Due to the rapid condensation, a substantial portion of the miscible solvent remains volatilized within the air. The separation may be further enhanced through the use of a counter-current flow heat exchanger. The air and condensed steam fractions are timely separated to minimize re-absorption of the miscible solvent vapors into the water phase. Separated vapors may be treated with conventional treatment technologies such as vapor-phase granular activated carbon, thermal or catalytic oxidation or chilled condensation.

DETAILED DESCRIPTION OF THE INVENTION

The invention comprises a stripping process that has been demonstrated to effectively remove 1,4-dioxane from water using steam and air as the stripping gases. Generally, stripping includes the transfer of a dissolved-phase substance in a liquid to a vapor-phase substance in a gas through the interactive contact of the liquid and gas. The disclosed process in particular embodiments has the ability to remove more than 90 percent of the 1,4-dioxane from water. Additionally, it produces the unexpected results of transferring the majority of the 1,4-dioxane mass from the water into the air where it can be readily addressed with conventional vapor treatment technologies such as vapor-phase granular activated carbon, thermal or catalytic oxidation or chilled condensation. Although the process can be applied to other solvents miscible in water having an azeotrope boiling point less than 100° C., the invention will be described with reference to 1,4-dioxane, a solvent of particular importance as noted above.

Figure 1:
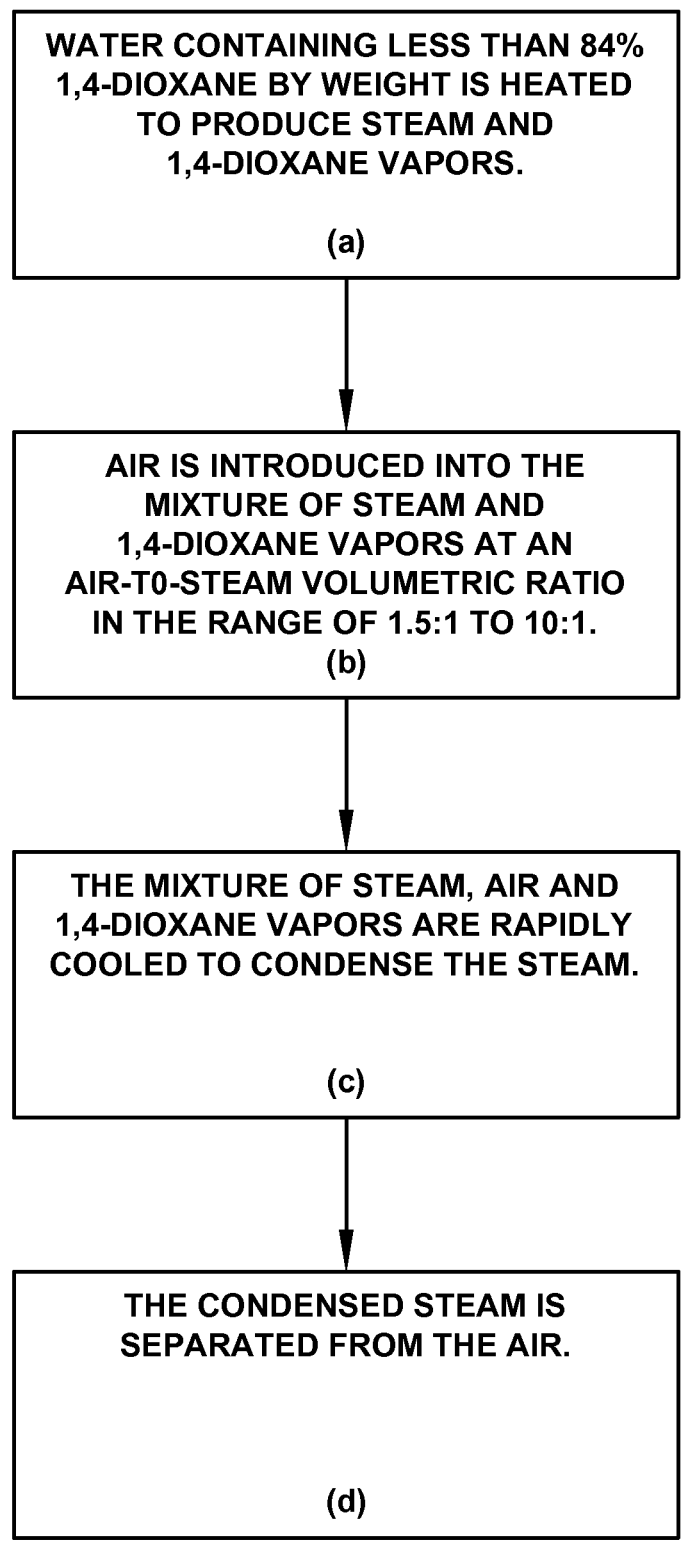
FIG. 1 shows a flowchart of the process according to an illustrative embodiment of the invention.

The treatment, in an illustrative embodiment of the invention, involves the following steps as summarized in FIG. 1:

In step (a) water containing less than 82% 1,4-dioxane by weight (82% is the azeotrope concentration) is heated, such as with electric resistance heating (ERH), until the water boils to produce steam that contains 1,4-dioxane vapors;

In step (b) air is introduced into the mixture of steam and 1,4-dioxane vapors at an air-to-steam volumetric ratio approximately in the range of 1.5:1 to 10:1;

In step (c) the mixture of steam, air and 1,4-dioxane vapors are rapidly cooled in a condensing device with a contact time in the approximate range of 0.2 to 10 seconds to condense between approximately 60 to 99 percent of the steam; and In step (d) the condensed steam is separated from the air.

Although 1,4-dioxane is not readily stripped from water, contrary to conventional beliefs, significant amounts of 1,4-dioxane can be removed from water if the stripping gas is steam. According to this illustrative embodiment of the invention, when air is added to the steam at a volumetric ratio in the range of approximately 1.5:1 to 10:1, it effectively reduces the steam condensation temperature into the range of about 50° C. to 75° C., thus stabilizing the 1,4-dioxane vapors in the gaseous phase during transport to a condensing system. Inside the condensing device, the steam is cooled to a condensing temperature in the range of 20° C. to 40° C. with a contact time in the range of 0.2 to 10 seconds. This allows the steam to quickly condense from the air without allowing sufficient time for the 1,4-dioxane to re-adsorb into the condensed liquids. In an exemplary embodiment of the invention, the condensation is allowed to occur in a counter-current heat exchanger system. The process effectively strips 1,4-dioxane from water and then conveys the majority of the 1,4-dioxane into the vapor phase where it is readily treated. The benefits of this process include a substantially lower concentration of 1,4-dioxane in solution that at times will not require any further treatment. This is because most of the 1,4-dioxane mass has been conveyed into the vapor phase for treatment so only a fraction remains in the water. Also, the condensate produced by the process does not typically contain minerals like iron, manganese and carbonate that interfere with advanced oxidation processes. If some form of advanced oxidation treatment is still required for the usually small fraction of 1,4-dioxane remaining in the condensate, it likely will be substantially easier and less expensive to treat because of lower concentrations and less mineral interference.

With regard to the 1.5:1 to 10:1 air-to-steam ratio range in the above illustrative embodiment the of the invention, the significance of the range is as follows: the 1.5:1 air-to-steam ratio is sufficient to get good transfer of 1,4-dioxane from the steam to air and is a ratio that is generally higher than typical in-situ thermal treatment operations, thus avoiding some limitations of conventional methods. At a ratio of 10:1, the equilibrium temperature of the steam-air mixture approaches 50° C., which is slightly higher than the upper temperature range of operations for the heat exchanger, so the aforementioned air-to-steam ratio range likely will cover the feasible operating range of the process.

Considering the amount of steam the air can hold at the air-to-steam ratios of 1.5:1 and 10:1, and comparing these amounts to the amount left in the air after the heat exchanger at best and worst-case condition, it is shown that approximately 60% to 99% of the steam will be condensed. This will typically cover the feasible range of our operations.

EXAMPLES

Figure 2:
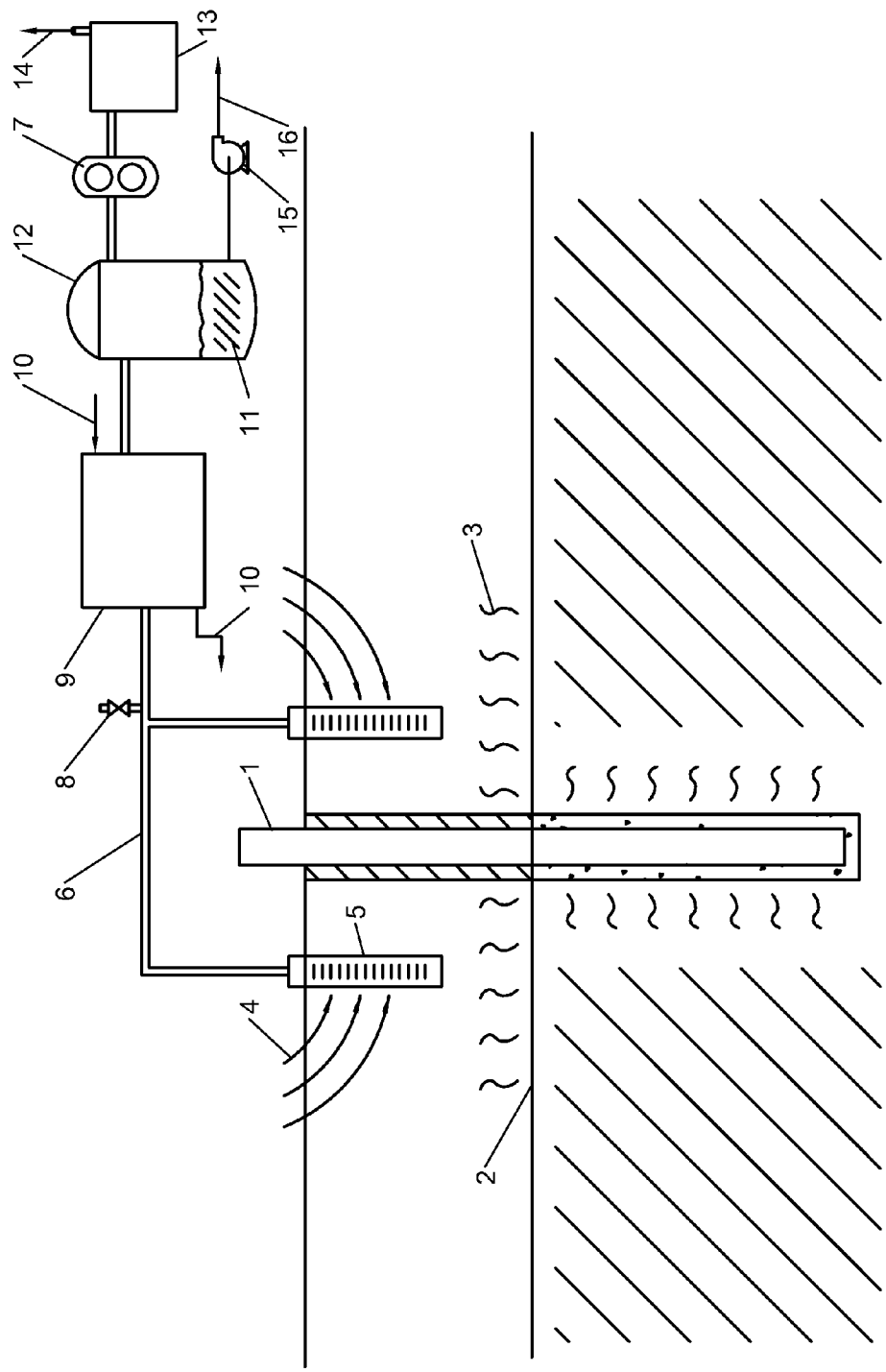
FIG. 2 shows an illustrative embodiment of the invention as used for in-situ treatment of groundwater containing 1,4-dioxane.

This treatment process that transfers the 1,4-dioxane to the air can be performed both in-situ or ex-situ. It is applicable to waste water or groundwater. An example of an in-situ treatment of groundwater is shown in FIG. 2 and is summarized as follows:

A heating system (1), such as ERH, steam injection, conductive heaters, strip heaters, cartridge heaters, radiative heating or other means of heating, is installed at a site that has groundwater (2) impacted with 1,4-dioxane at a concentration less than 82% by weight. The heating system supplies the groundwater with enough power and energy to cause the groundwater to boil. Groundwater is a term that includes the groundwater found in a fully-saturated soil system, perched water in permeable layers of soil, or the water that is adsorbed or trapped within the porosity of the vadose zone. The power used to heat the groundwater is typically greater than 25 watts per cubic meter to overcome heat loss to the surroundings.

The groundwater is heated until the water boils to produce steam (3) that contains 1,4-dioxane vapors. Air (4) is then introduced into the mixture of steam and 1,4-dioxane vapors at an air-to-steam ratio of approximately 1.5:1 to 10:1. The air may be injected directly into the groundwater, such as by groundwater sparging, the air and the steam may be combined after the steam boils from the groundwater to reduce overall energy demand of the process. In FIG. 2, the air is combined with the steam in the subsurface above the water table using vapor recovery wells (5) to pull the air into the subsurface for mixing, but the air can be introduced above grade, below grade or even within a vapor recovery plenum at the surface. The steam and vapors may be removed from the subsurface through vapor recovery piping (6) with a vacuum producing device (7) such as a pump or blower as shown in FIG. 2. Sizing a vapor recovery vacuum system with components of sufficient capacity to dilute the steam with 1.5 to 10 parts of air-to-steam can be beneficial for providing the proper air and steam mixing system. As described above, the air may be drawn into the steam in the subsurface or it may be introduced into the vapor piping system above ground, but a combination of air introduction techniques may be used with some air being introduced to the steam below ground and some being introduced above ground by adding an air bleed valve (8) on the vacuum side of the vacuum producing device as is also shown in FIG. 2.

The gas mixture of steam, air and 1,4-dioxane vapors is rapidly cooled inside a condensing device (9) to a temperature in the range of 20° C. to 40° C. so that about 60% to 99% of the steam is condensed to water using a contact time in the range of about 0.2 to 10 seconds within the condensing device. The condensing device may be any number of conventional heat exchanger systems, such as shell-and-tube, plate-and-frame, air-cooled, spiral, lamella, double-pipe, refrigerated or regenerative heat exchanger. In an exemplary embodiment, the condensing device operates in a counter-current flow with the cooling fluid (10) flowing in the opposite direction of the steam within the condensing device.

The condensed steam (11) is then separated from the air in a vapor-liquid separation device (12). In the exemplary embodiment of the invention shown in FIG. 2, the vapor-liquid separator device (12) is a simple gravity-separation knock-out tank placed immediately after the vapor outlet of the condensing device. The separating device may also consist of other separation design concepts for fluid and vapor separation with designs common in the art such as centrifugal separation, cyclone separation design, impingent plates and/or demisters.

While in FIG. 2 the vacuum inducing device (7) is shown after the vapor-liquid separation device (12), it should be noted that the vacuum inducing device (7) may be placed before or after the vapor-liquid separation device (12) without departing from the scope of the invention. Similarly, the vacuum inducing device (7) may also be placed after a vapor treatment device (13).

The air, which now contains the majority of 1,4-dioxane mass, exits the vapor-liquid separation device (12) and is sent to the vapor treatment device (13) where the 1,4-dioxane is removed from the air prior to discharging the air to the atmosphere or elsewhere. The vapor treatment processes may consist of vapor-phase granular activated carbon because 1,4-dioxane has a strong adsorption affinity to adsorb to carbon in its vapor state even though it adsorbs extremely poor to carbon when dissolved in water. However, other conventional vapor treatment processes may be used such as thermal or catalytic oxidation or chilled condensation. The treated air is then discharged to the atmosphere at the air discharge location (14).

The condensed steam is removed from the separation device (12) by a pump (15) where it can be further treated if necessary, or it may be directly discharged to a sanitary sewer at this point where low residual concentrations of 1,4-dioxane in the pump discharge (16) can be treated by biological processes at a municipal biological treatment system.

Figure 3:
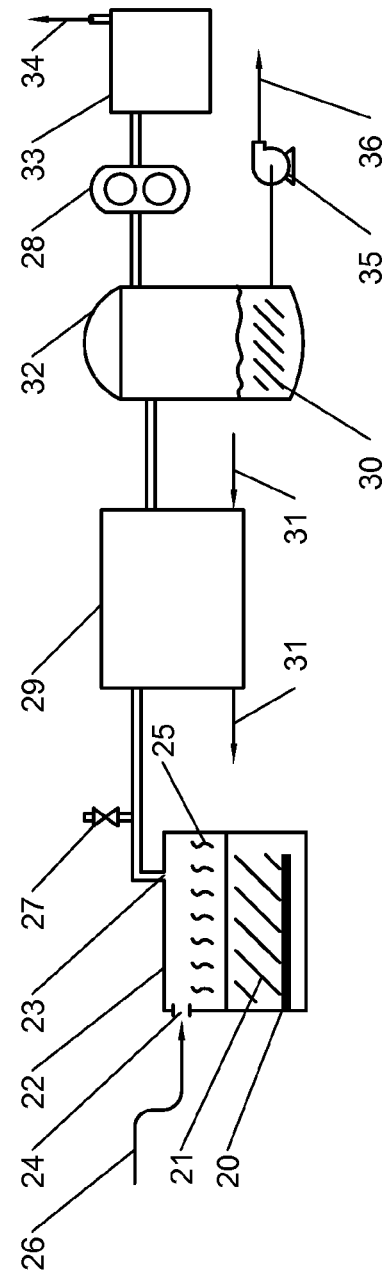
FIG. 3 shows a further illustrative embodiment of the invention as used for ex-situ treatment of water containing 1,4-dioxane.

An illustrative embodiment of the invention for an ex-situ application, such as for the above-ground treatment of groundwater or wastewater is shown in FIG. 3 and is summarized as follows:

A source of heat energy (20) is used to boil water (21) that contains less than 82% 1,4-dioxane by weight. The source of heat energy may be a resistive heater, or it may include other conventional heating mechanisms such as steam injection, steam jackets, conductive heaters, strip heaters, cartridge heaters, radiative heating, direct fire and the like. The heating occurs within a fluid holding device (22), which in most circumstances would consist of a vessel, but it may also occur within a pipe. The fluid holding device has at least one steam exit point (23) and an optional air intake point (24). The water impacted with 1,4-dioxane is heated until it boils and produces steam (25) that also contains 1,4-dioxane vapors. The heating to produce steam and 1,4-dioxane vapors may be performed as a continuous heating process or it may be performed in a batch process where steam is released by flash-evaporation. In flash-evaporation, the heated water is exposed to an atmospheric pressure after heating that causes a portion of the water to immediately flash into steam containing the 1,4-dioxane vapors.

Air (26) is introduced into the mixture of steam and 1,4-dioxane vapors at an air-to-steam ratio of approximately 1.5:1 to 10:1. The air may be injected directly into the fluid holding device or subsequent down-stream piping by a bleed valve (27) or it may be added by vacuum by placing the fluid holding device (22) or subsequent down-stream piping under vacuum with a vacuum inducing device (28) such as a blower or vacuum pump. In an illustrative embodiment of the invention, the air and the steam are combined after the steam boils from the water using a vacuum system to avoid pressurization of the system as shown in the embodiment of FIG. 3.

The mixture of steam, air and 1,4-dioxane vapors is rapidly cooled with a condensing device (29) to a temperature in the range of 20° C. to 40° C. to condense the majority of steam into condensed steam (30). The contact time in the condensing device (29) is optimally in the range of about 0.2 to 10 seconds. The condensing device (29) may be any number of conventional condensing devices, for example, heat exchanger systems that include shell-and-tube, plate-and-frame, air-cooled, spiral, lamella, double-pipe, refrigerated or regenerative heat exchangers. In an exemplary embodiment, the condensing device (29) operates in a counter-current flow with the cooling fluid (31) flowing in the opposite direction of the steam.

The condensed steam is removed from the air using a vapor-liquid separation device (32). In an illustrative embodiment of the invention, the condensed steam is separated from the air stream through the use of a simple gravity separation knock-out tank placed immediately at the vapor outlet of the condensing device (29). The vapor-liquid separation device (32) may be designed for enhanced vapor and fluid separation using separation designs such as for example, centrifugal separation, cyclone separation, impingent plates and/or demisters.

While in FIG. 3 the vacuum inducing device (28) is shown after the vapor-liquid separation device (32), it should be noted that the vacuum inducing device (28) may be placed before or after the vapor-liquid separation device (32) without or with negligible impact to the performance of the process. Similarly, the vacuum inducing device (28) may be placed in the process after vapor treatment (33) or it may be eliminated completely if the air is introduced into the fluid holding device (22) using the vacuum inducing device (28) in a mode that introduces pressurized air into the system at the optional air intake point (24) or bleed air valve (27).

The air exiting the vapor-liquid separation device (32) now contains the majority of 1,4-dioxane mass, so it is sent to a vapor treatment process (33) where the 1,4-dioxane is removed from the air prior to discharging the air to the atmosphere at the air discharge location (34). The air treatment device may consist of vapor-phase granular activated carbon since 1,4-dioxane has a strong adsorption affinity to carbon in its vapor state. However, other conventional vapor treatment processes may be used such as thermal or catalytic oxidation or chilled condensation.

The condensed steam (30) is removed from the separation device (32) by a pump (35) where it can be further treated if necessary, or it may be directly discharged to the sanitary sewer at this point since the low residual concentrations of 1,4-dioxane in the pump discharge (36) can be treated by biological processes at a municipal biological treatment system.

The principal and mode of operation of this invention have been described in its preferred embodiments in relation to an in-situ and ex-situ application. However, it should be noted that this invention may be practiced otherwise than as specifically illustrated and described without departing from its scope.

Field Data

Groundwater containing more than 2,000 micrograms of 1,4-dioxane per liter of water (ug/L) was heated in situ with ERH for 6 months at an average power density of approximately 30 watts per cubic meter of soil. As a result of the thermal treatment, greater than 95% of the 1,4-dioxane was removed from the groundwater. 1,4-dioxane was measured in the extracted vapors and steam. After separation in a counter-current flow plate-and-frame heat exchanger, only 5% of the 1,4-dioxane mass remained in the condensed steam while 95% of the mass was transferred into the air where it was treated using vapor-phase granular activated carbon. The average air-to-steam ratio during operations was 1.5:1 although air-to-steam ratios as high as 10:1 were applied during early phases and later phases of the project. Sampling of the condensate during the middle of ERH operations showed that condensed steam contained 94 ug/L of 1,4-dioxane. At a condensed steam production rate of 19 liters per minute (L/min), this was equivalent to 2.7 grams per minute of 1,4-dioxane being removed from the site in the condensed steam. Sampling of the air stream showed that the air contained 1,600 part-per-billion 1,4-dioxane. At an airflow rate of 42.5 cubic meters per minute ($m^3$/min), this was equivalent to 54.4 grams of 1,4-dioxane being removed from the site in the air phase. As such, 95% of the 1,4-dioxane mass being removed from the groundwater was conveyed into the air. The air was passed through a bed of vapor phase granular activated carbon where it was adsorbed onto the carbon and removed from the air stream prior to discharging the air to the atmosphere.

Various embodiments of the invention have been described, each having a different combination of elements. The invention is not limited to the specific embodiments disclosed, and may include different combinations of the elements disclosed or omission of some elements and the equivalents of such elements.

While the invention has been described by illustrative embodiments, additional advantages and modifications will occur to those skilled in the art. Therefore, the invention in its broader aspects is not limited to specific details shown and described herein. Modifications, for example, to the configuration of the apparatus used to carry out the methods described herein and incorporation of equivalent elements, may be made without departing from the spirit and scope of the invention. Accordingly, it is intended that the invention not be limited to the specific illustrative embodiments, but be interpreted within the full spirit and scope of the appended claims and their equivalents.

The invention claimed is:

1. A method of removing solvents miscible in water from water wherein the miscible solvents have an azeotrope boiling point less than 100° C. by
implementing a stripping process using steam and air as the stripping gases, the method comprising the steps of:
heating water containing a miscible solvent until the water boils to produce a mixture of steam and miscible solvent vapors;
introducing air into the mixture of steam and the miscible solvent vapors to produce a mixture of steam, air and the miscible solvent vapors;
cooling the mixture of steam, air and the miscible solvent vapors to condense the steam; and separating the steam that has been condensed from the air, thereby transferring the miscible solvent to the air.

2. The method of claim 1 wherein the miscible solvent is 1,4-dioxane.

3. The method of claim 1 further comprising removing the miscible solvent from the air.

4. The method of claim 2 wherein the water contains less than 82% 1,4-dioxane by weight.

5. The method of claim 1 wherein the water is heated with electric resistance heating.

6. The method of claim 1 further comprising:
removing the miscible solvent from the air using a vapor treatment process.

7. The method of claim 2 wherein the air is introduced into the mixture of steam and 1,4-dioxane vapors at an air-to-steam volumetric ratio in the range of about 1.5:1 to 10:1.

8. The method of claim 7 wherein the introduction of the air reduces the steam condensation temperature to within a range of about 50° C. to 75° C.

9. The method of claim 2 wherein the mixture of steam, air and 1,4-dioxane vapors is cooled with a contact time in the range of about 0.2 to 10 seconds in a condensing device to condense the steam.

10. The method of claim 9 wherein about 60% to 99% of the steam is condensed.

11. The method of claim 1 wherein separating the condensed steam from the air is performed with a counter-current flow heat exchanger.

12. The method of claim 1 wherein the miscible solvent vapors in the gaseous phase are transported to a condenser where the steam is rapidly condensed in a time period that does not allow the miscible solvent to re-adsorb into the condensed liquids.

13. The method of claim 2 wherein the steam is cooled to a condensing temperature in the range of about 20° C. to 40° C.

14. The method of claim 1 wherein the method is performed in-situ.

15. The method of claim 1 wherein the method is performed ex-situ.

16. The method of claim 1 further comprising treating the condensed steam by a biological process.

17. The method of claim 1 wherein a portion of the method is performed in-situ and the remainder of the method is performed ex-situ.

18. The method of claim 1 wherein the treatment is applied to ground water.

19. The method of claim 1 wherein the treatment is applied to waste water.

20. A 1,4-dioxane treatment method comprising the steps of:
heating the water containing less than 82% 1,4-dioxane by electric resistance heating until the water boils to produce steam that contains 1,4-dioxane vapors;
introducing air into the mixture of steam and 1,4-dioxane vapors at an air-to-steam volumetric ratio in the range of approximately 1.5:1 to 10:1 thereby reducing the steam condensation temperature into the range of about 50° C. to 75° C.;
rapidly cooling the mixture of steam, air and 1,4-dioxane vapors to a temperature in the range of about 20° C. to about 40° C. to condense a majority of the steam using a contact time of about 0.2 seconds to 10 seconds in a counter-current heat exchanger system;
separating the steam that has been condensed from the air in a vapor-liquid separation device; and
removing the 1,4-dioxane from the air using a vapor treatment process.

\* \* \* \* \*